(No Model.)

G. O. WALTON.
STRAINER.

No. 569,260.  Patented Oct. 13, 1896.

Witnesses.
Albert Popkin
C. P. Jones

Inventor.
George O. Walton
By
Geo. Chandlee
Attorney.

UNITED STATES PATENT OFFICE.

GEORGE O. WALTON, OF EASTON, PENNSYLVANIA.

STRAINER.

SPECIFICATION forming part of Letters Patent No. 569,260, dated October 13, 1896.

Application filed July 8, 1896. Serial No. 598,441. (No model.)

*To all whom it may concern:*

Be it known that I, GEORGE O. WALTON, a citizen of the United States, residing at Easton, in the county of Northampton, State of Pennsylvania, have invented certain new and useful Improvements in Strainers; and I do hereby declare the following to be a full, clear, and exact description of the invention, such as will enable others skilled in the art to which it appertains to make and use the same.

My invention relates to strainers in general, and more particularly to that class intended for use in connection with a skillet, stew-pan, or similar utensil, and has for its object to provide a device of this nature which may be readily attached and detached from the utensil, may be simple of construction and operation, and cheaply made.

Figure 1:
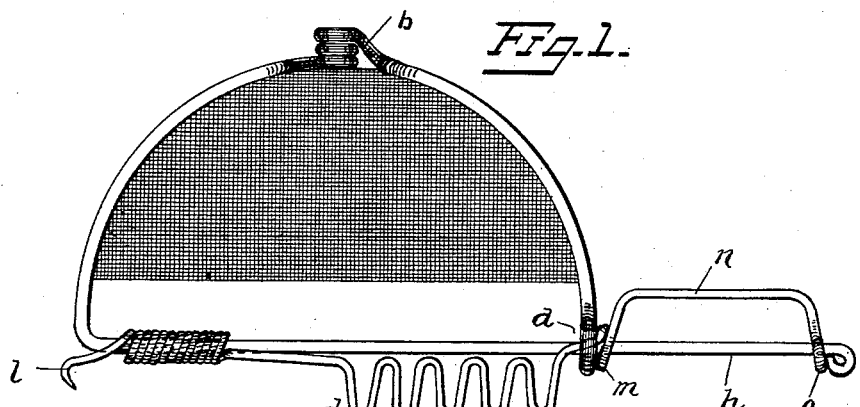
Figure 2:
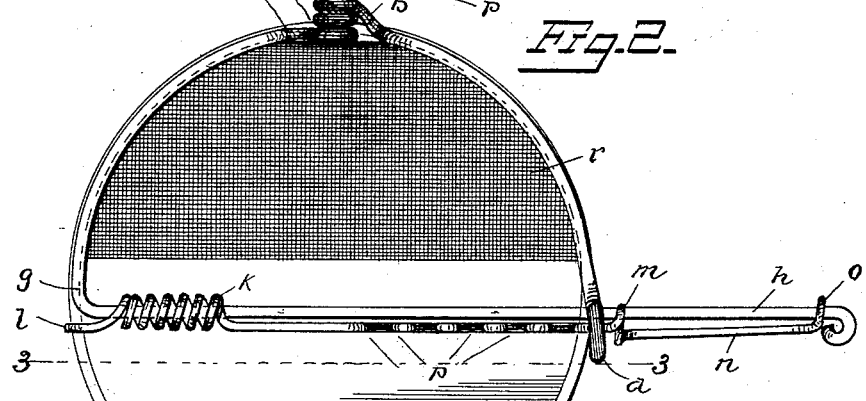
Figure 3:
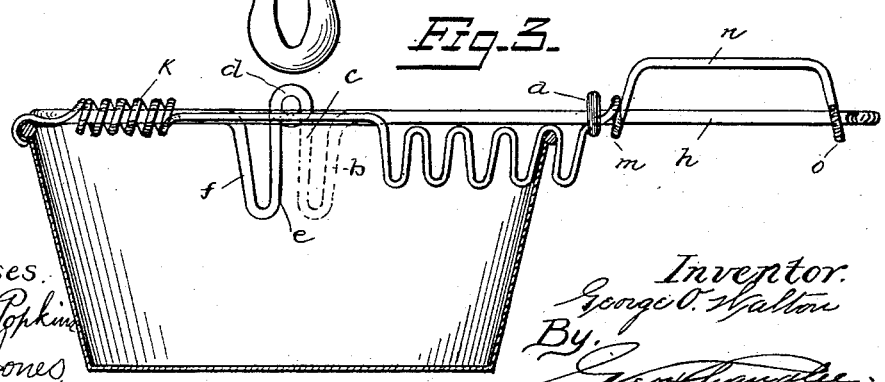

In the drawings forming a part of this specification, and in which like letters of reference indicate similar parts in the several views, Figure 1 is a plan view of my strainer detached. Fig. 2 is a view similar to Fig. 1, showing the strainer applied to a skillet; and Fig. 3 is a section on line 3 3 of Fig. 2, further explaining the method of attachment of the strainer to the skillet.

Referring now to the drawings, in constructing a device in accordance with my invention I employ a length of spring metal, preferably in the form of a wire, in one end of which I form a loop or eye $a$. The wire is then bent in a plane of the eye to form a quarter of a circle, said quarter-circle terminating in a downwardly-turned portion $b$, after which the wire is turned and taken upwardly at $c$. It is then given a series of convolutions in the plane of the sections $b$ and $c$ to form a helical spring $d$, after which it is taken downwardly at $e$, turned and taken upwardly at $f$, and is then extended at right angles to the last-named section and in the form of a quarter of a circle in the plane of the first quarter-circle, whereby the resultant is a semicircle divided centrally by a spring-section having a downwardly-projecting finger at each side. From the termination $g$ of the second quarter-circle the wire is then turned abruptly and is extended through the eye $a$ a sufficient distance to form a handle $h$ for the manipulation of the strainer. Stretched on the flexible frame thus formed, and secured in place by soldering or otherwise, is a wire-netting $r$ or other suitable form of foraminous material, said netting forming the strainer proper of my device.

In order to hold the strainer in position upon a pan, I encircle the portion of the wire lying between the point $g$ and the eye $a$ with a helical spring $k$, which spring is provided at one end with a hook $l$, which lies in proximity to the bend at the point $g$, the opposite end of the spring $k$ extending through the eye $a$, said wire being then given a turn $m$ around the handle $h$, then extended parallel therewith at $n$, and finally given a last turn around the handle at $o$, the section $n$ thus forming means for the manipulation of the hook $l$. Between the spring $k$ and the turn $m$ the last-named wire is provided with a series of corrugations $p$, the purpose of which will be presently explained.

Having thus described my invention, the operation thereof is as follows: The strainer being first held in the position shown in Fig. 1 the loop $l$ is caused to engage the rim of a pan, and one of the corrugations $p$ is manipulated to receive the opposite edge of the pan, as shown in Fig. 3 of the drawings, that corrugation being employed which will produce sufficient tension on the spring $k$ to insure constant engagement. The strainer-frame comprising the semicircular portion is then swung to the right and lowered upon the pan, the edge of which latter is received between the depending portions $c$ and $e$ of the frame. When in this position, the whole apparatus is held securely in place, due to the spring action of the frame and the helix $k$.

When the strainer is applied to a pan as above described, it is then only necessary that the latter be tilted, when any liquid poured therefrom will be effectively strained through the foraminous body $r$, as will be readily understood.

It will of course be appreciated that I may use any material desired in the manufacture of my device, and also that the particular construction herein shown and described may be varied without departing in any way from the spirit of my invention.

Having thus described my invention, what I claim is—

1. A device of the class described comprising a frame having a foraminous body attached thereto and provided with means for attachment to the desired vessel, and spring retaining means secured to said frame and adapted to act in conjunction therewith to secure the foraminous body to said vessel.

2. A device of the class described comprising a spring-frame having a foraminous body secured thereto, fingers on the frame adapted for engagement with a vessel and means acting in conjunction with said fingers to attach the strainer to the vessel.

3. A device of the class described comprising a spring-frame having a foraminous body secured thereto and provided with fingers adapted to engage a vessel, a spring-retracted hook carried by the frame and adapted to engage the vessel and means for applying and removing said retraction with respect to the hook.

4. A device of the class described comprising a spring-frame provided with a foraminous body and having fingers adapted to engage a vessel, a spring carried by the frame and provided with a hook at one extremity and adapted to engage a vessel, the other extremity of said spring being extended and provided with a series of corrugations adapted to engage a vessel and retract the hook through the medium of said spring.

In testimony whereof I affix my signature in presence of two witnesses.

GEORGE O. WALTON.

Witnesses:
A. H. BOWERS,
CHAS. B. BRUNNER.